(12) United States Patent
Aalto et al.

(10) Patent No.: US 7,153,424 B2
(45) Date of Patent: Dec. 26, 2006

(54) APPARATUS FOR PURIFYING WATER

(76) Inventors: Kari Aalto, Lapinkaari 20 A 10, FIN-33180, Tampere (FI); Valery Antipov, 19 Pereulok Yuny, Simferopol, 95017 (UA); Alexander Melnikov, 33 Geroev Stalingrada Str., Apartment 134, Simferopol, 95047 (UA)

( * ) Notice: Subject to any disclaimer, the term of this patent is extended or adjusted under 35 U.S.C. 154(b) by 346 days.

(21) Appl. No.: 10/380,283

(22) PCT Filed: Aug. 16, 2001

(86) PCT No.: PCT/FI01/00725

§ 371 (c)(1),
(2), (4) Date: Jul. 2, 2003

(87) PCT Pub. No.: WO02/22233

PCT Pub. Date: Mar. 21, 2002

(65) Prior Publication Data

US 2004/0011721 A1 Jan. 22, 2004

(30) Foreign Application Priority Data

Sep. 12, 2000 (FI) .................................... 2000200

(51) Int. Cl.
*B01D 63/00* (2006.01)
*B01D 27/14* (2006.01)

(52) U.S. Cl. ............... 210/321.6; 210/252; 210/257.1; 210/257.2; 210/266; 210/282; 210/321.75; 210/321.78; 210/321.84; 210/321.87; 210/473; 210/477; 210/483; 210/488; 210/497.01; 210/502.1

(58) Field of Classification Search ............... 210/252, 210/257.1, 257.2, 259, 266, 282, 321.6, 321.75, 210/321.78, 321.84, 321.87, 473, 477, 483, 210/488, 497.01, 497.1, 502.1
See application file for complete search history.

(56) References Cited

U.S. PATENT DOCUMENTS 4,863,602 A * 9/1989 Johnson ...................... 210/484
5,464,541 A 11/1995 Aysta et al.

(Continued)

FOREIGN PATENT DOCUMENTS

| EP | 0 285 908 | 10/1988 |
| EP | 0 349 315 | 1/1990 |
| EP | 1 127 607 | 8/2001 |
| GB | 2 197 647 | 5/1988 |

OTHER PUBLICATIONS

Hanot, Henri; De Coninck, Michele; Jones, Kevin. Expanding the use of track-etched membranes. IVD Technology. Nov./Dec. 2002. http://www.devicelink.com/ivdt/archive/02/11/002.html.*

*Primary Examiner*—John Kim
(74) *Attorney, Agent, or Firm*—Venable LLP; Eric J. Franklin

(57) ABSTRACT

An apparatus for purifying water, that includes a frame, in connection with which is arranged a primary space for water to be filtered, secondary space for filtered water and a filter. The filter is arranged to filter water, that is driven by gravity from the primary space existing in the frame to the secondary space, wherein the filtering influence of the filter is based essentially on a thin filtering film made of plastic based material. Essentially underneath the primary space is arranged an accessory space for the filtering means, that is in connection with the primary space and that has an essentially smaller cross-section than the same, in order to keep the filter surrounded by unclean water in the auxiliary space of the primary space, being limited from the secondary space, totally separate from the secondary space.

23 Claims, 8 Drawing Sheets

U.S. PATENT DOCUMENTS

| | | | |
|---|---|---|---|
| 5,637,214 A * | 6/1997 | Kahana | 210/282 |
| 5,830,360 A * | 11/1998 | Mozayeni | 210/651 |
| 5,904,846 A * | 5/1999 | Clements et al. | 210/321.77 |
| 6,183,647 B1 * | 2/2001 | Aalto et al. | 210/636 |
| 6,312,609 B1 * | 11/2001 | Solyanik et al. | 210/767 |
| 6,387,260 B1 * | 5/2002 | Pimenov et al. | 210/282 |
| 6,712,965 B1 * | 3/2004 | Aalto et al. | 210/266 |

* cited by examiner

APPARATUS FOR PURIFYING WATER

FIELD OF THE INVENTION

The invention relates to an apparatus for purifying water, that includes a frame, in connection with which is arranged a primary space for water to be filtered, secondary space for filtered water and filtering means, which filtering means are arranged to filter water, that is driven by gravity from the primary space existing in the frame to the secondary space, wherein the filtering influence of the filtering means is based essentially on a thin filtering film made of plastic based material, such as PTM (Particle Track Membrane), TeM (Track-etch Membrane) or like, the thickness of which is advantageously 7–25 μm and the size of pores advantageously between 0.05–10 μm. The filtering means include at least a support arrangement to support the filtering film, such as an auxiliary frame having a planar or cylindrical support surface or like, in connection with which is arranged a flow way in order to lead the filtered water to the secondary space.

BACKGROUND OF THE INVENTION

In the Finnish Patent number 98810 there has been presented a water purification device, that is partly of the type above and that has a Membrane-structured filtering film. The solution in question is meant to operate on so called syphon principle, thanks to which the structure of the same is very simple. The water purification device in question is very safe and easy to use in practice, because the quality of the water flowing down to the collecting point, taking place thanks to the syphon phenomenon self-powered and continuously, is always homogeneous regardless of the user of the device. This is first of all due to the fact, that a water purification device equipped with a thin PTM- or TeM filtering film does not at any stage let through material parts exceeding a certain particle size, in which case, when the filtering film gets dirty, only the penetration speed of the filter decreases and may even totally be interrupted, in case the filtering film is not cleaned every now and then.

The type of device described above is very easy to use in most heterogeneous connections, e.g. for filtering of lake water on terrain or under other circumstances as well, when so called tap water may not be exploited or when it is not drinkable. A disadvantage of the device in question is mainly the fact; that e.g. in ordinary household use, the device requires use of separate vessels, so that the syphon phenomenon may be carried out.

On the other hand, nowadays there are water purifying devices on the market also, which have a so called primary space and a secondary space built-in with the same body. One purifying device existing on the market nowadays has name "KATADYN, Type TRK", that is based on ceramic filter cartridges, that exist in a uniform reservoir and that let through water gravity-operated from a primary space to a secondary space, that is placed underneath the primary space and that is equipped with a tap in order to run filtered water. In the solution in question there has been exploited furthermore activated carbon, that is placed inside the ceramic filter.

Functioning of this type of structure is inadequate first of all thanks to its slowness (about 40 litres/24 hours), which is among other things due to the fact, that when the level of water surface gets down, the filtering surface of the filter gets continuously smaller. Ceramic material has furthermore such a disadvantage, that ceramic filtering material absorbs substances existing in the water to be treated, such as humus or like, which is why it first of all gets dyed thoroughly and on the other hand naturally lets a large quantity of fine-grained humus through the same. This is why a ceramic filter clogs up in the course of time and it is not possible to "open" the same or in other words e.g. wipe it clean otherwise than peeling off its surface, thanks to which the substance layer carrying out filtration gets thinner, which finally causes a risk for reliability. When using this type of solution, one may not under all circumstances have full certainty, whether the water, that has been treated is totally safe for drinking, that is why it is safest to avoid use of the type of purifying device described above under particularly disadvantageous circumstances.

On the other hand, there are on the market nowadays also water purifying devices being sold under name "BRITA" or "AQUALETTE, LEIFHEIT", that are based on lighter structures in such respect, that merely activated carbon for water filtration and purifying has been exploited therewith. This is why it is not technically taken possible to reach the level of ceramic filters described above, that is why this type of solutions are applicable mostly for tidy housekeeping purposes, wherein the meaning is mostly to remove e.g. taste of chlorine from water. Actual removal of bacteria is not enabled by the type of solutions.

SUMMARY OF THE INVENTION

It is the aim of the apparatus for purifying water according to this invention to achieve a decisive improvement in the problems presented above and thus to raise substantially the level of prior art. In order to carry out this aim, the main characteristic of the present invention is such, that essentially underneath the primary space is arranged an accessory space for the filtering means, that is in connection with the primary space and that has an essentially smaller cross-section than the same, in order to keep the filtering means surrounded by unclean water in the accessory space of the primary space, being limited from the secondary space, totally separate from the secondary space.

As the most important advantages of the apparatus according to the invention may be mentioned the simplicity, reliability and the compact size of its structure. This is why the apparatus according to the invention is applicable for most heterogeneous applications in most heterogeneous connections and environments e.g. either as a purifying device to be kept on table or as a relatively small-sized pot. The principle according to the invention enables an extremely simple composition thanks to the fact, that both the primary space and the secondary space are stationarily and in a built-in manner in the same frame, whereby, however, between the same has been arranged a filter arrangement based on a filtering film of Membrane-type, that operates extremely reliably. Because the filter arrangement is placed in an accessory space surrounded by the secondary space and however physically totally separate therefrom, the filter arrangement is not in any way directly in touch with the filtered water, that is why e.g. replacement of the filter or other necessary measures, are not in any way able to cause a risk so, that bacteria might pass to the secondary space or in other words to the clean water side. The apparatus according to the invention may be carried out to work gravity-operated by a direct flow-through or on the other hand alternatively by exploiting e.g. siphon phenomenon. Use as well as service and maintenance of an apparatus according to the invention is thus extremely simple and easy in most heterogeneous applications and environments, thanks to which the principle according to the invention may be adapted also in very primitive circumstances reliably.

As a summary of the advantages of the water purifying apparatus according to the invention, technical reliability and safety of its use may be mentioned, because the uniform and even surface structure of the filtering film of Membrane-type being exploited therewith as well as those essentially cylindrical. holes existing therein (see FIGS. 4a and 4b) enable first of all cleaning of the filtering film without the risk of the film getting damaged. In addition to that, the cylindrical holes make sure of the reliable operating of the filtering film particularly in view of prevention of e.g. bacteria penetration, because the size of pores is at each point of the filtering film always within allowed limits at its height.

The discussion below sets forth preferred embodiments of the apparatus according to the invention.

BRIEF DESCRIPTION OF THE DRAWINGS

The invention will now be described in detail with reference to the accompanying drawings, wherein in FIGS. 1a and 1b is shown an advantageous embodiment of the apparatus according to the invention with two alternative operating principles.

DETAILED DESCRIPTION OF EMBODIMENTS OF THE INVENTION

Figure 1A:
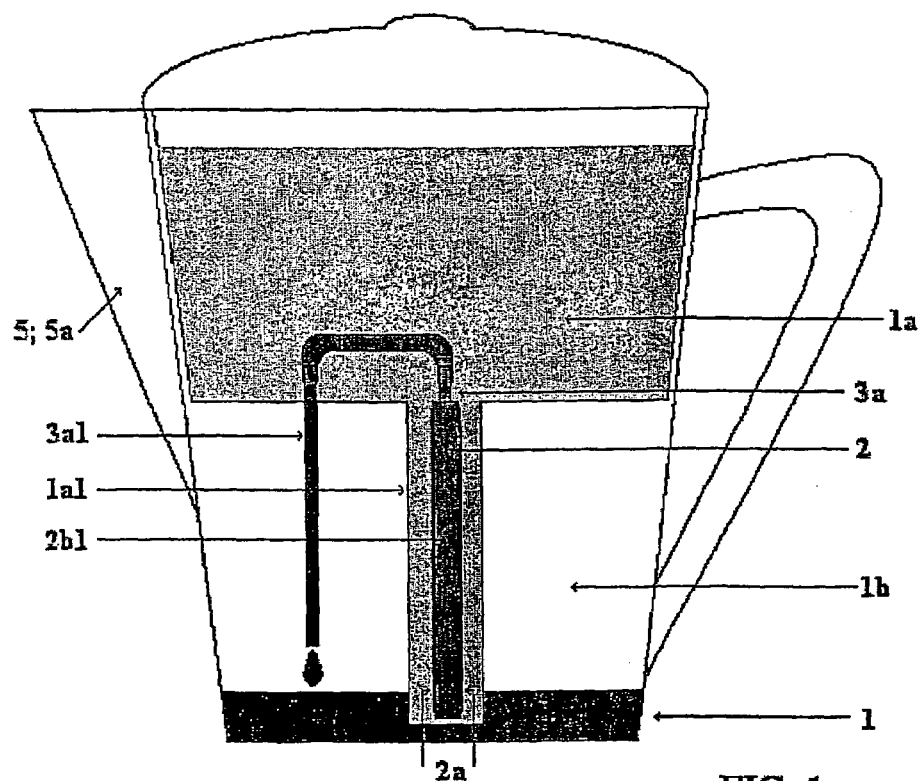

The invention relates to an apparatus for purifying water, which includes a frame 1, in connection with which is arranged a primary space 1a for water to be filtered, secondary space 1b for filtered water and filtering means 2. The filtering means 2 are arranged to filter water, that is driven by gravity from the primary space 1a existing in the frame to the secondary space 1b, wherein the filtering influence of the filtering means is based essentially on a thin filtering film 2a made of plastic based material, such as PTM (Particle Track Membrane), TeM (Track-etch Membrane) or like, the thickness of which is preferably 7–25 µm and the size of pores between 0.05–10 µm, whereby the filtering means include at least a support arrangement 2b to support the filtering film 2a, such as an auxiliary frame 2b1, 2b2 having a planar or cylindrical support surface or like, in connection with which is arranged a flow way 3a in order to lead the filtered water to the secondary space 1b. Essentially underneath the primary space 1a is arranged an accessory space 1a1 for the filtering means 2, that is in connection with the primary space and that has an essentially smaller cross-section than the same, in order to keep the filtering means 2 surrounded by unclean water in the accessory space 1a1 of the primary space 1a, being limited from the secondary space 1b, totally separate from the secondary space 1b.

Figure 4A:
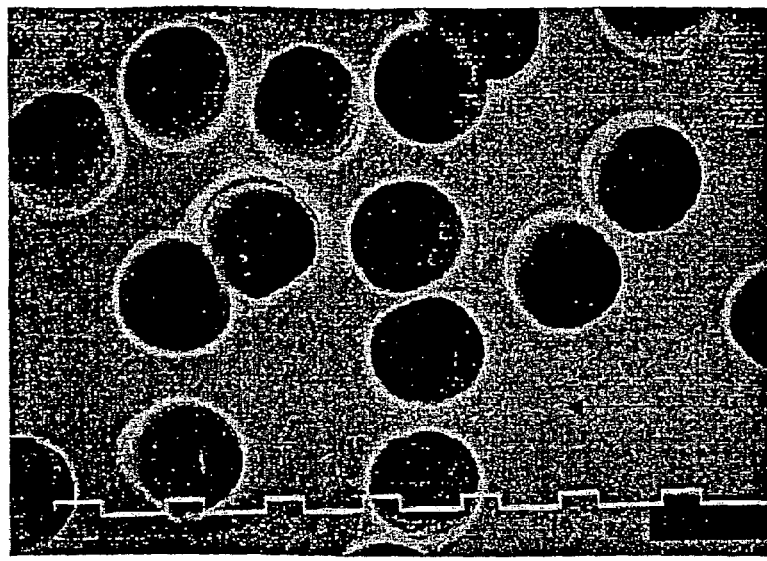
FIGS. 4a and 4b is shown a front view and a cross-sectional perspective view of photos, that are enlarged at a high degree and that are made with differing enlargements, representing a typical PTM/TeM filtering film being exploited with the purifying device for water.
Figure 4B:
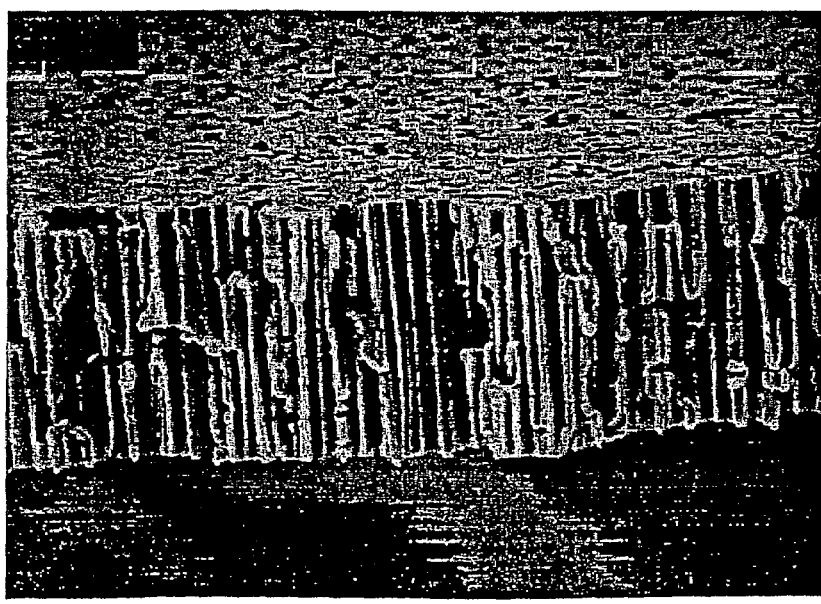

As an advantageous embodiment of the apparatus, the filtering film 2a is as shown e.g. in FIGS. 4a, 4b, 5 and 7 a uniform and an even surface structure, the porosity of which is provided by essentially cylindrical holes existing therein. In this connection FIGS. 4a and 4b show a front view and a cross sectional perspective view of enlarged photos, that are made with differing enlargements, representing a typical PTM/TeM filtering film being exploited with the purifying device for water, that is manufactured by irradiating and etching a raw film sheet. By using the type of filtering film 2a described above, the pressure loss caused by the filtering means may be efficiently minimized. This is why the purifying apparatus for water according to the invention is thus applicable to be used as a drinking water purifier, that is thus easy to use and reliable under most heterogeneous circumstances all the way from ordinary household use up to extremely difficult circumstances. In addition to that the flow-through of the purifying apparatus for water according to the invention as well as the pressure loss caused by the same are decisively better than the same of a ceramic purifier, e.g. the manufacturing costs of which are also manyfold.

From the technical point of view it is also clear, that a porosity of this type of Membrane-film, which is typically between 5–15%, may not be achieved by a ceramic filtering material, because the porosity of ceramic material is always between 30–95% in practice. A reliable operating of the filter may not be obtained with a ceramic structure particularly in the sense of bacteria filtration because of the unhomogeneous construction of the ceramic structure, whereby instead, when according to the invention a filtering film is being used made of plastic based material, it is possible to make sure, that the size of pores is exactly e.g. 0.4 µm at its height.

Figure 7:
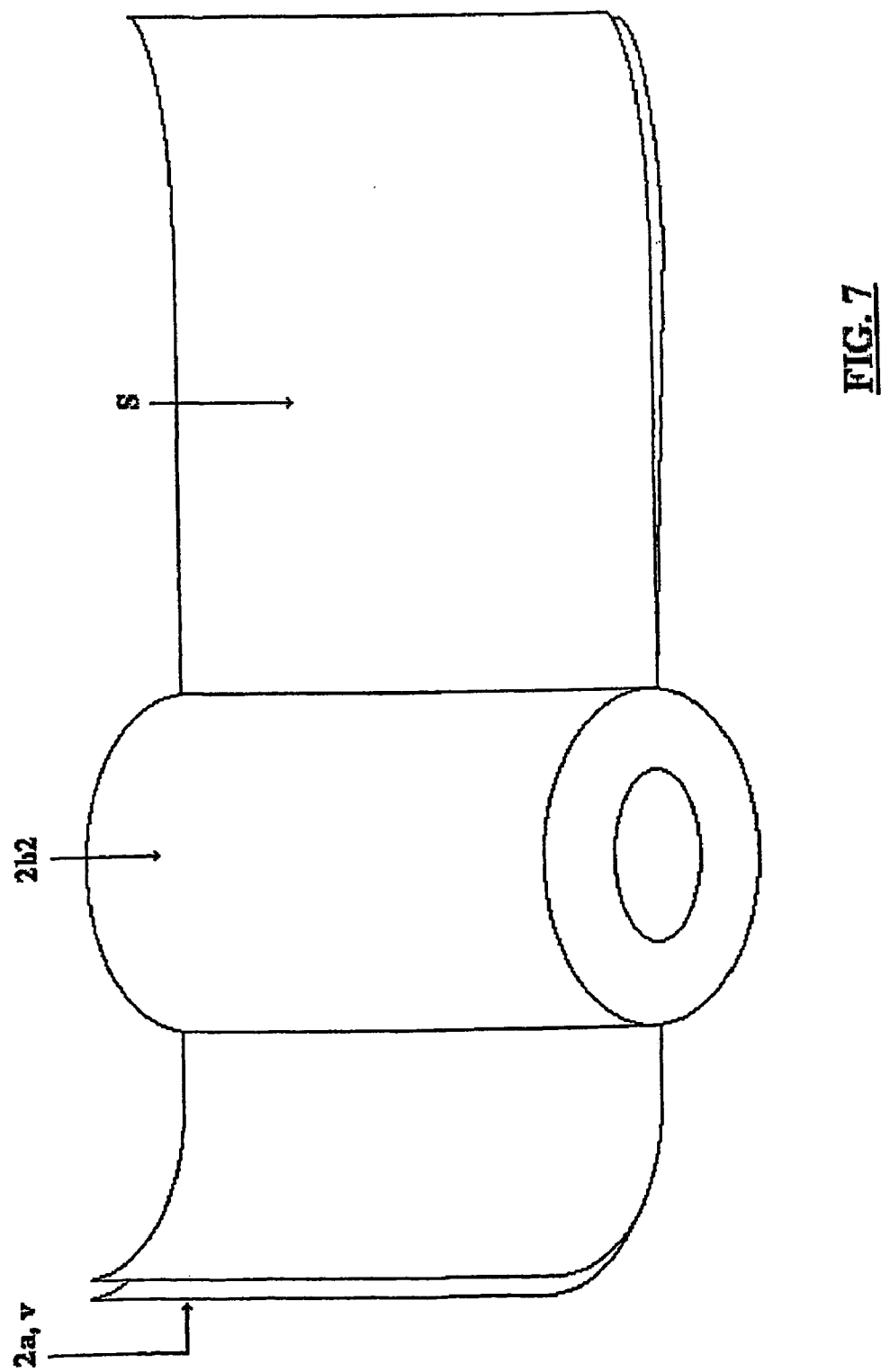
FIG. 7 is shown a part of the filter cartridge solution according to FIG. 6 being opened.

As a particularly advantageous embodiment with reference particularly to FIG. 7, the filtering film 2a is strengthened preferably by lamination or correspondingly with a strengthening layer v made of non-woven material, that is arranged on one or both outer surfaces of the same, such as on the surface placed against the support surface supporting the same. The strengthening material v of the filtering film 2a is furthermore as an advantageous embodiment plastic based material, such as polyethylene, polyprophylene and/or like, the specific weight of which is 30–300 g/m$^2$, advantageously 150–200 g/m$^2$. The size of pores of the perforation in the filtering film 2a is furthermore advantageously between 0.1–0.6 µm, wherein the pore density of the same is preferably $1.5 \times 10^9 - 5 \times 10^7$ holes/cm$^2$.

Figure 1B:
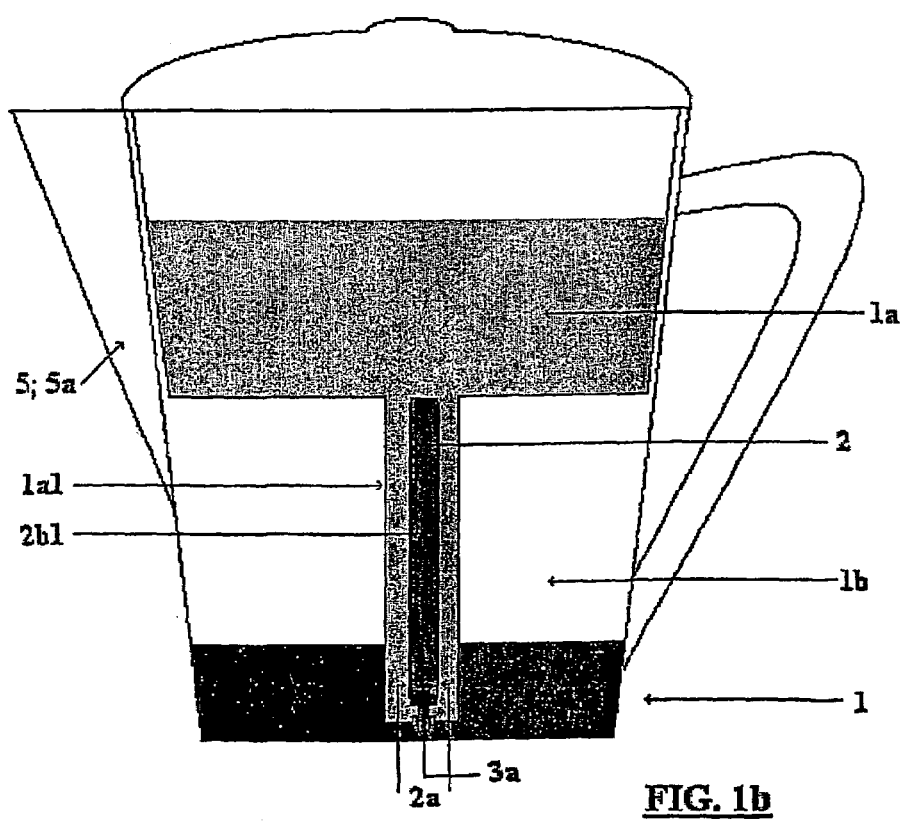
Figure 3B:
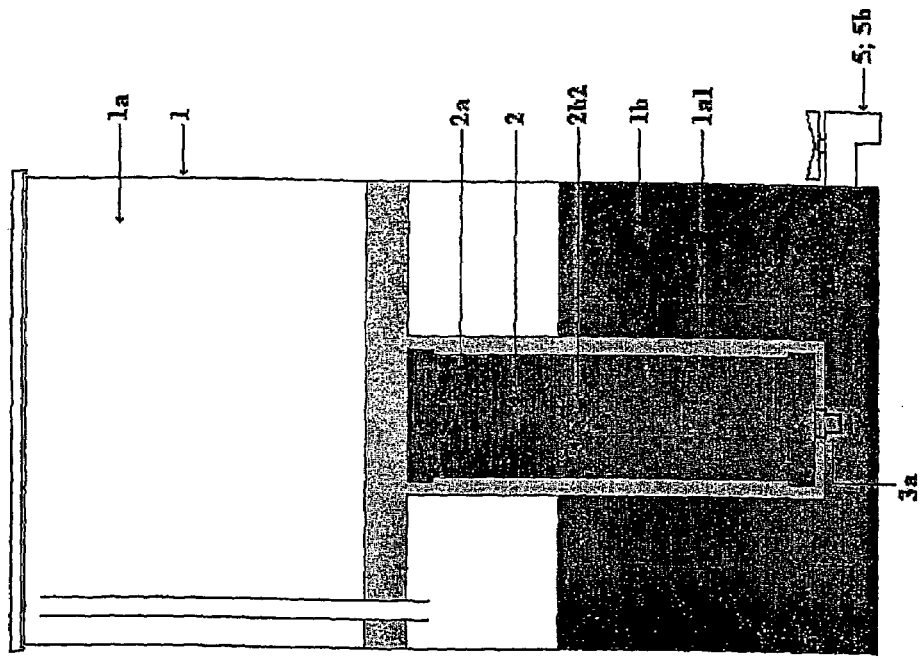
FIGS. 3a and 3b is shown furthermore corresponding views of an alternative solution particularly with respect to FIG. 2.
Figure 3A:
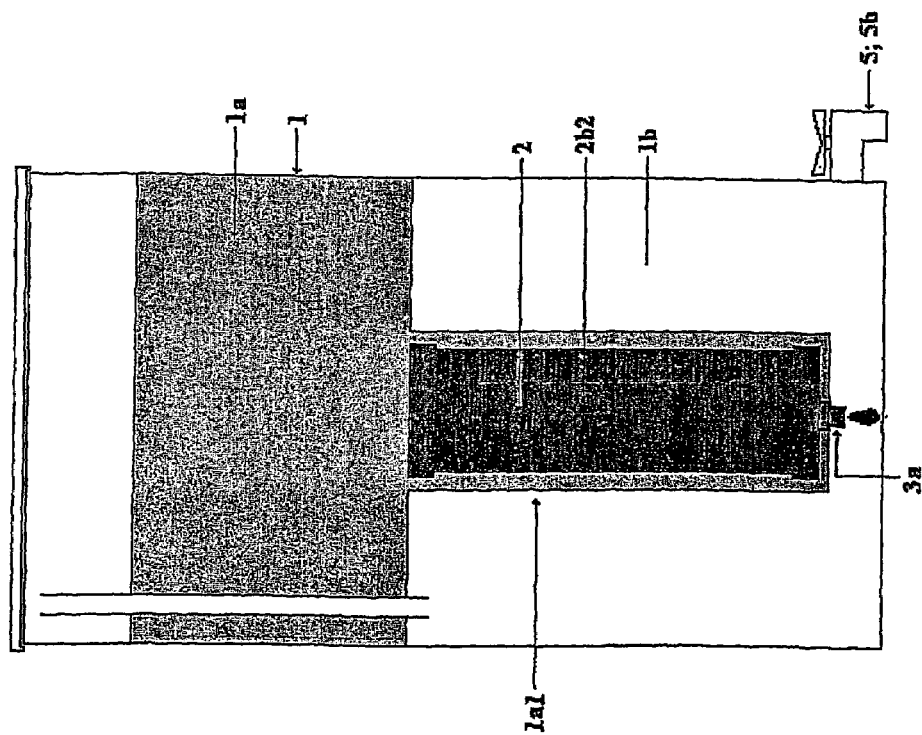

Particularly in the advantageous embodiments shown in figures 1b, 3a and 3b, the apparatus is arranged to act by gravity so, that water flowing down from the primary space 1a from above the filtering means 2 gets exhausted after passing the filtering means 2 through a flow way 3a, that is arranged essentially at the bottom part of the filtering means, essentially into the bottom part of the secondary space 1b.

Figure 2B:
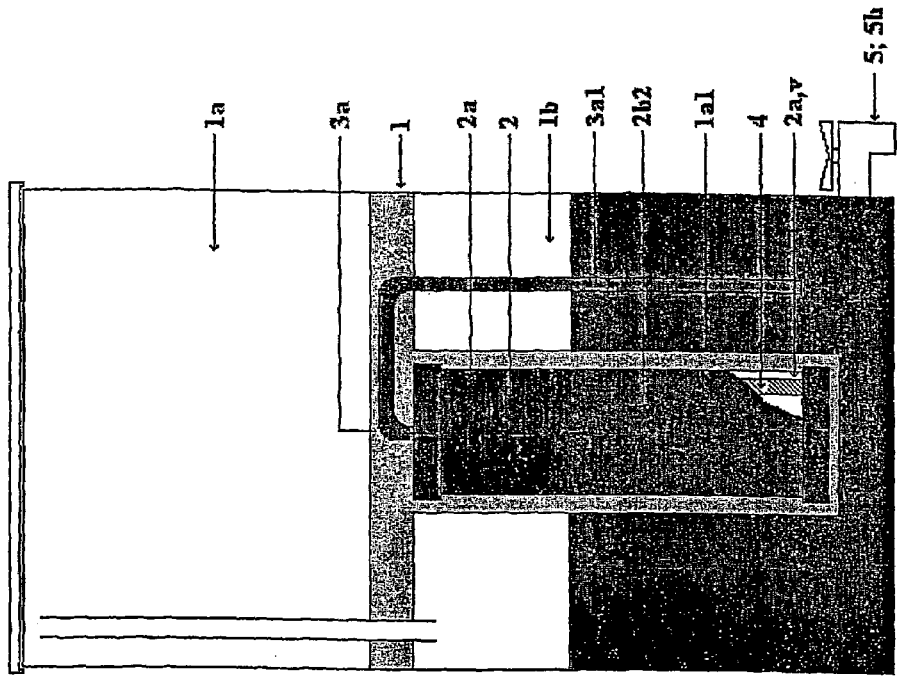
FIGS. 2a and 2b is shown furthermore an alternative embodiment with respect to FIG. 1 in the beginning of the purifying process, when the primary space is filled, and correspondingly at an end situation, when the secondary space is filled.
Figure 2A:
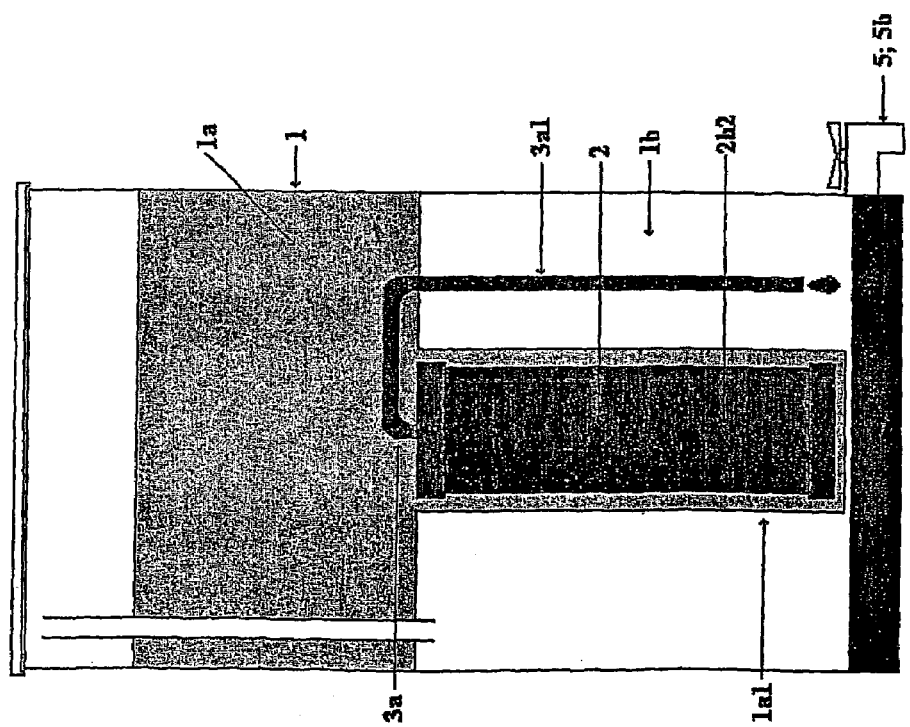

On the other hand in the advantageous embodiment shown in FIGS. 1a, 2a and 2b, the apparatus is arranged to act by gravity utilizing syphon phenomen so, that water flowing down from the primary space 1a from above the filtering means 2 through the filtering means 2 is being led by means of a flow way 3*a*, such as through a pipe arrangement 3*a*1 or correspondingly, by utilizing syphon phenomen essentially above the filtering means 2, essentially into the bottom part of the secondary space 1*b*.

Figure 5:
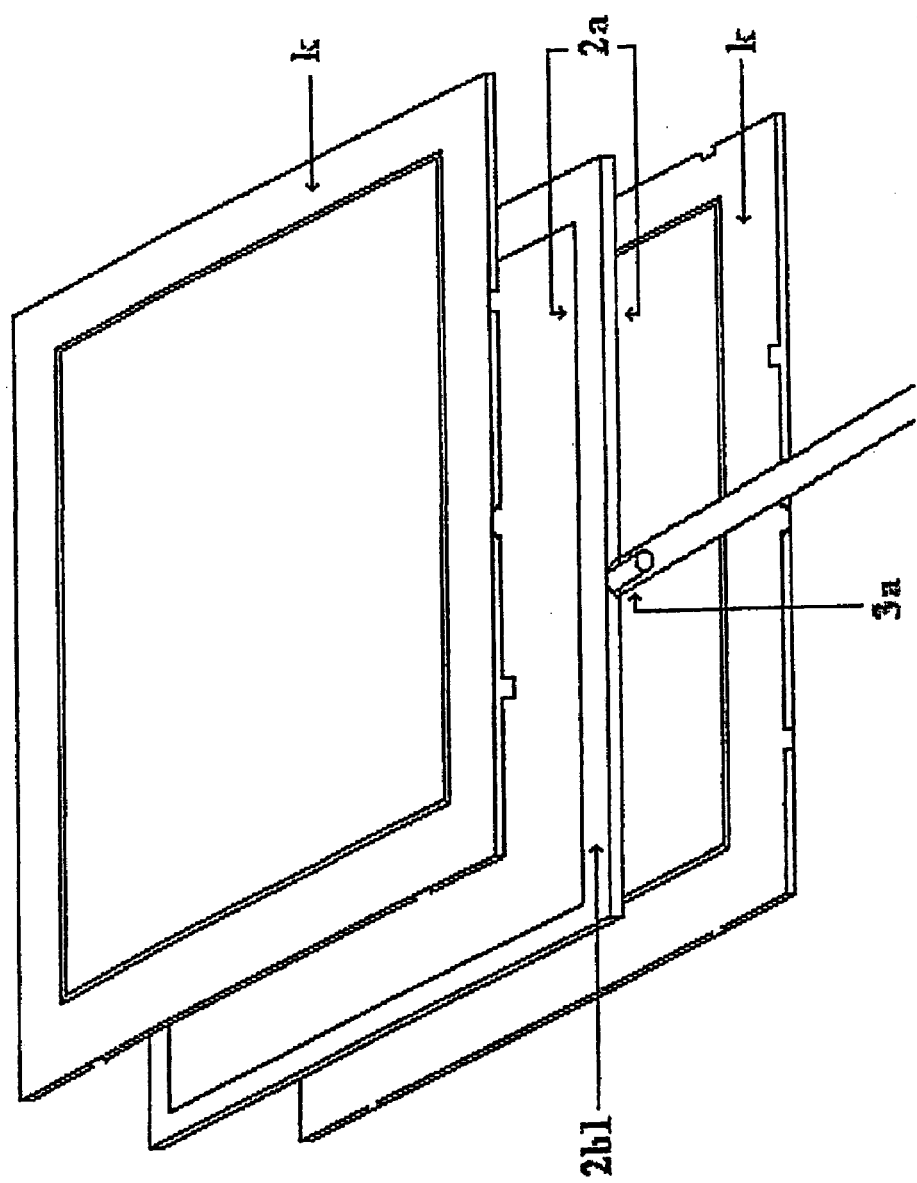
FIG. 5 is shown an advantageous structure of a planar filter cartridge being used as the filtering means.

Particularly in the type of embodiment shown in figures 1*a* and 1*b*, the cross-section of the accessory space 1*a*1 is formed advantageously like a rectangle, whereby the filtering means 2 are formed e.g. of one or more planar filtering cartridges shown in FIG. 5, in which the filtering film 2*a*, that is protected by protecting covers k being fastened advantageously on quick-release principle, is closed hermetically in connection with a planar auxiliary frame 2*b*1. There is naturally not a necessary need for using this type of protecting covers.

Figure 6:
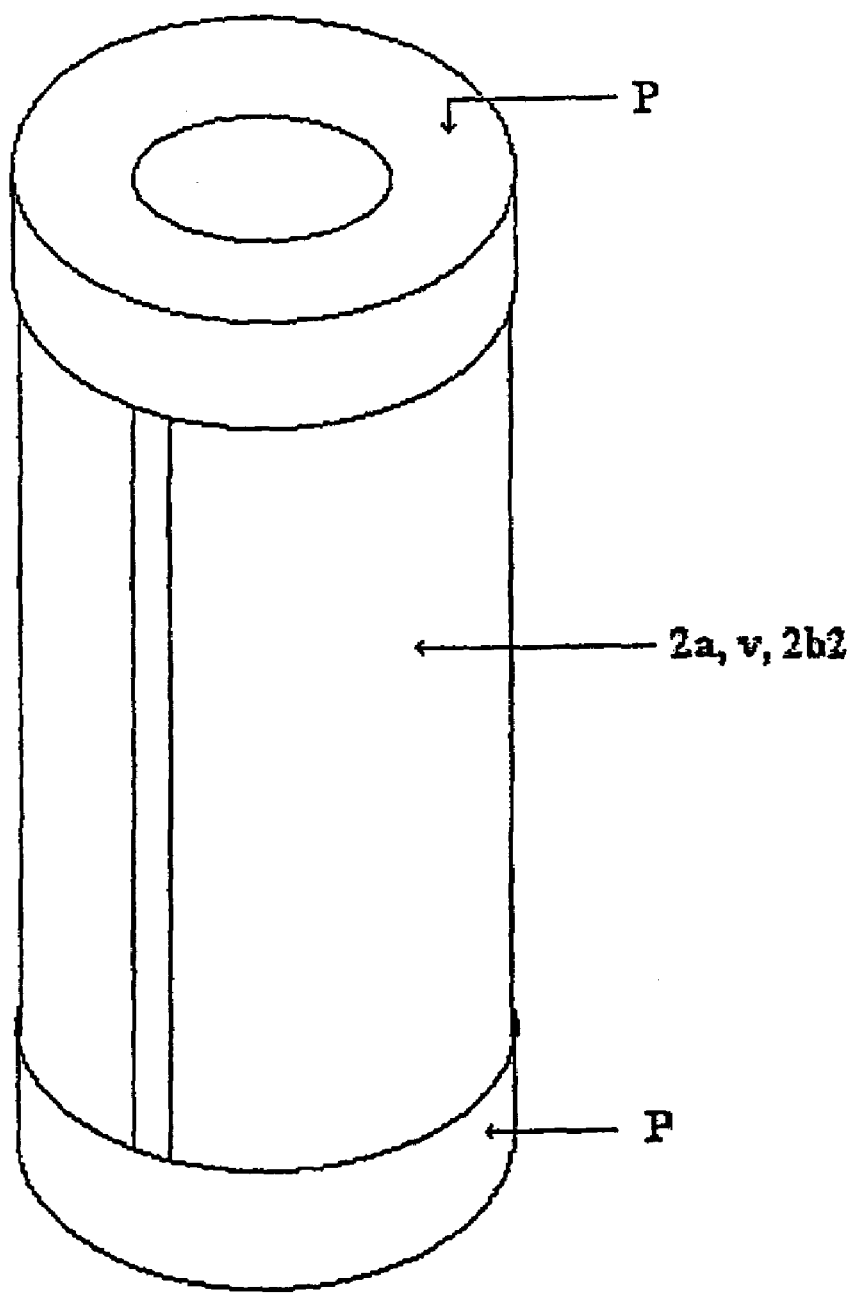
FIG. 6 is shown furthermore an alternative cylindrical filter cartridge solution with respect to FIG. 5.
Figure 8:
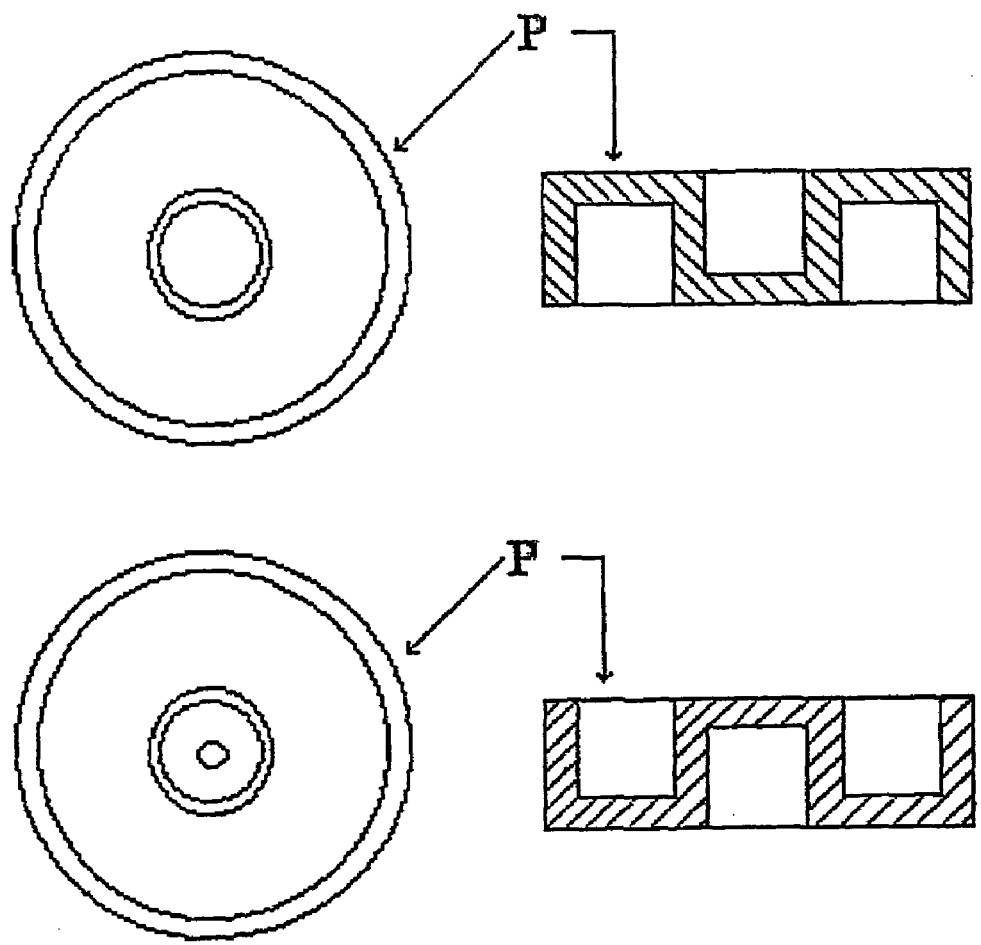
FIG. 8 is shown end parts included in the entirety shown in FIG. 6, when seen from the center of the filter cartridge and as cross-section views.

Correspondingly in the type of embodiments shown in FIGS. 2*a*, 2*b* and 3*a*, 3*b*, the cross-section of the accessory space 1*a*1 is arranged circular, whereby the filtering means 2 are formed e.g. of one or more cylindrical filtering cartridges shown in FIG. 6, in which the filtering film 2*a* is closed hermetically in connection with a cylindrical auxiliary frame 2*b*2. In FIGS. 7 and 8 there are presented some advantageous part entireties of this type of composition with porous extra protecting layers s and end flanges p.

Furthermore as an advantageous embodiment in connection with the filtering means 2, such as e.g. in front of the auxiliary frame 2*b*1 and the filtering film 2*a* or on the principle shown in FIG. 2*b* inside the auxiliary frame 2*b*2, are arranged accessory filtering means 4 for treating water, that is going to pass or that has already passed the filtering film 2*a*, furthermore by activated carbon or like before removing of the same through the flow way 3*a* into the secondary space.

The apparatus includes naturally also an exhaust flow arrangement 5 for exploitation of the filtered water, such as e.g. a pouring spout 5*a* of the type shown in FIGS. 1*a* and 1*b*, or on the other hand a valve 5*b* of the type shown in FIGS. 2*a*, 2*b* and 3*a*, 3*b*. In this type of embodiment the "ventilation" of the secondary space 1*b* may be carried out e.g. by an air duct of the presented type, that connects the air spaces of the primary and the secondary spaces or on the other hand by totally separate ventilation arrangements.

It is obvious, that the invention is not limited to the embodiments presented or described above, but instead it can be modified to a great extent within the basic idea. So it is in principle possible to carry out the construction of the apparatus according to the invention in very many ways, e.g. by combining cylindrical cartridges with an accessory space, the cross-section of which is rectangular or the shape of which is polygon, or vice versa and so on. Furthermore it is naturally possible to exploit also the type of solutions shown in the drawings otherwise, by using several filter cartridges, that are placed e.g. side by side, one after another or placed in a suitable manner adjacent to each other. As the filtering film it is naturally possible to use also other than PTM or TeM films being mentioned above, that are suitable for this purpose.

It is naturally clear, that also the pipe arrangements as well as the valve arrangements may be carried out in most heterogeneous ways depending on how and in which connection the apparatus is being exploited. The valve arrangement may thus be carried out by valves acting mechanically or by pressurized medium and/or in addition to the above also by exploiting electricity, in case purifying apparatuses are desired that may be controlled e.g. on so called remote control principle. Correspondingly the accessory purifying means may be placed in a cylindrical embodiment outside the cylinder or in a planar embodiment inside the auxiliary frame. By placing the accessory filtering means at the opposite outer surfaces of the planar filter cartridge e.g. by adapting planar structures therewith may make replacement of the means in question significantly easier, though the same being placed on the side of the dirty water are not as long lasting as the ones being placed on the clean water side.

So, the advantageous embodiment shown in the drawings show mainly directive principles, in addition to which the apparatus according to the invention may be manufactured by many parts of the same by using most heterogeneous manufacturing techniques and materials, which matters have naturally influence to the appearance and manufacturing costs of each structure being achieved at each time.

The invention claimed is:

1. An apparatus for purifying water, comprising:
   a frame;
   a primary space arranged within the frame and operative to receive unfiltered water;
   a secondary space arranged within the frame and operative to receive filtered water;
   filtering means operative to filter the unfiltered water driven by gravity from the primary space to the secondary space, the filtering means comprising a thin plastic filtering film having a thickness of 7–25 µm and including substantially cylindrical pores extending therethrough, the pores having a size of 0.1–0.6 µm and a pore density of $1.5 \times 10^9 - 5 \times 10^7$ holes/cm$^2$, the filtering film having a uniform and even surface;
   a filter support comprising a planar or cylindrical support surface operative to support the uniform and even surface of the filtering film;
   an accessory space arranged underneath and in connection with the primary space, the accessory space having a smaller cross-section than the primary space, the accessory space being operative to receive the filtering means and maintain the filtering means surrounded by unfiltered water, the accessory space being isolated and totally separate from the secondary space; and
   a flow way operative to lead the filtered water from the accessory space to the secondary space.

2. The apparatus according to claim 1, wherein the filtering means comprises Particle Track Membrane or Track-etch Membrane.

3. The apparatus according to claim 1, wherein the filter support comprises an auxiliary frame having a planar or cylindrical support surface operative to support the uniform and even surface of the filtering film.

4. The apparatus according to claim 1, further comprising:
   a strengthening layer operative to strengthen the filtering film.

5. The apparatus according to claim 4, wherein the strengthening layer is laminated to the filtering film.

6. The apparatus according to claim 4, wherein the strengthening layer comprises non-woven material.

7. The apparatus according to claim 4, wherein one strengthening layer is arranged on opposite outer surfaces of the filtering film.

8. The apparatus according to claim 4, wherein the strengthening layer is arranged on the surface placed against the support surface supporting the same.

9. The apparatus according to claim 4, wherein the strengthening layer comprises plastic material.

10. The apparatus according to claim 9, wherein the strengthening layer comprises at least one of polyethylene and polypropylene.

11. The apparatus according to claim 9, wherein a specific weight of the strengthening layer is 30–300 g/m².

12. The apparatus according to claim 9, wherein a specific weight of the strengthening layer is 150–200 g/m².

13. The apparatus according to claim 1, wherein the apparatus acts by gravity, such that water flows down from the primary space from above the filtering means and is exhausted after passing the filtering means through the flow way, wherein the flow way is arranged at the bottom part of the filtering means, into the bottom part of the secondary space.

14. The apparatus according to claim 1, wherein the apparatus acts by gravity utilizing a siphon phenomenon, such that water flows down from the primary space from above the filtering means through the filtering means and is led by the flow way, by utilizing the siphon phenomenon, from above the filtering means into the bottom part of the secondary space.

15. The apparatus according to claim 14, wherein the flow way comprises a pipe arrangement.

16. The apparatus according to claim 1, wherein the accessory space has a rectangular cross-section, whereby the filtering means comprises one or more planar filtering cartridges, in which the filtering film is closed hermetically in connection with a planar auxiliary frame.

17. The apparatus according to claim 1, wherein the accessory space has a circular cross-section, whereby the filtering means comprises one or more cylindrical filtering cartridges, in which the filtering film is closed hermetically in connection with a cylindrical auxiliary frame.

18. The apparatus according to claim 1, further comprising:

accessory filtering means operative to treating water prior to passing through the filtering means or after passing through the filtering means.

19. The apparatus according to claim 18, wherein the accessory filtering means comprises activated carbon.

20. The apparatus according to claim 18, wherein the accessory filter means is arranged in front of the filtering means.

21. The apparatus according to claim 18, wherein the accessory filter means is arranged inside the auxiliary frame.

22. The apparatus according to claim 1, further comprising:

an exhaust flow arrangement operative to permit exploitation of the filtered water.

23. The apparatus according to claim 21, wherein the exhaust flow arrangement comprises a pouring spout or a valve.

* * * * *